US006400396B1

(12) United States Patent
Bowker et al.

(10) Patent No.: US 6,400,396 B1
(45) Date of Patent: *Jun. 4, 2002

(54) DISPLACED-BEAM CONFOCAL-REFLECTION STREAK LINDAE APPARATUS WITH STRIP-SHAPED PHOTOCATHODE, FOR IMAGING VERY SMALL VOLUMES AND OBJECTS THEREIN

(75) Inventors: Kent Bowker, Essex, MA (US); Stephen C. Lubard, Woodland Hills, CA (US)

(73) Assignee: Areté Associates, Sherman Oaks, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/556,716

(22) Filed: Nov. 13, 1995

Related U.S. Application Data

(63) Continuation of application No. 07/781,038, filed on Oct. 21, 1991, now abandoned, which is a continuation-in-part of application No. 08/046,335, filed on Apr. 12, 1993, now Pat. No. 5,467,122.

(51) Int. Cl.[7] .................................................. H04N 7/18
(52) U.S. Cl. ........................ 348/81; 356/73; 356/301; 356/318; 356/328

(58) Field of Search .............................. 348/31, 61, 81, 348/143, 144, 145, 147, 135, 215; 356/73, 301, 318, 328

(56) References Cited

U.S. PATENT DOCUMENTS 5,450,125 A * 9/1995 Ulich .......................... 348/31
5,936,739 A * 8/1999 Cameron ..................... 356/441

* cited by examiner

Primary Examiner—Chris Kelley
Assistant Examiner—Shawn S. An
(74) Attorney, Agent, or Firm—Ashen & Lippman

(57) ABSTRACT

An imaging system for detecting the contents of a turbid medium which is at least partially transmissive of light. The system includes a light source for producing a series of discrete pulse beams which are substantially uniform in intensity to illuminate sections of the medium, a large aperture optical element for collecting and focusing the reflected portions of the pulse beam, a streak tube with a very large photocathode for collecting the maximum amount of light from weak returns, and a detector. A volume display of the medium is generated by translating the transmitted and received light beams normal to the longitudinal axis of the pulse beam to illuminate adjacent sections of the medium, and combining the sections to provide a volume display. The motion is used to provide the scan of the pulse beam.

24 Claims, 4 Drawing Sheets

DISPLACED-BEAM CONFOCAL-REFLECTION STREAK LINDAE APPARATUS WITH STRIP-SHAPED PHOTOCATHODE, FOR IMAGING VERY SMALL VOLUMES AND OBJECTS THEREIN

This is a continuation of application Ser. No. 07/781,038 (which was filed Oct. 21, 1991), through the intermediary of now-pending continuation-in-part application Ser. No. 08/046,335, filed on Apr. 12, 1993, and scheduled to issue Nov. 14, 1995, as U.S. Pat. No. 5,467,122.

BACKGROUND OF THE INVENTION

This invention relates generally to a system for detecting an object in a light reflecting medium using lidar.

Several techniques have evolved over the years for overcoming the problems associated with detecting targets in a light scattering medium. One technique utilizes a narrow beam from a pulsed laser, such as a doubled YAG, to scan the medium. Generally, the beam transmitter and the receiver aperture, which must be quite large to collect sufficient energy, are scanned together, using scanning mirrors or other devices such as prisms. The energy received from each pulse is detected with a photomultiplier, or similar quantum-limited device, and the resulting signal is amplified with a logarithmic response amplifier, digitized, and then processed. Because the pulses are short, typically 10 nanoseconds, the detection electronics must be very fast, digitizing at 200 MHz or faster. Since the pulse rate is low, the processing rates required to analyze the data from each pulse are within the state of the art.

Another technique is range gating, which utilizes a pulsed flood beam and a number of gated image intensifiers with charge-coupled devices (CCD's). The intensifiers are gated on when the beam pulse reaches a specific depth. Typically, the gate is applied just as the pulse beam encounters the object so that the full reflected return is obtained. A second intensifier is gated on a little later to detect the shadow of the object. The image of the object is obtained by taking the difference of the two images which then eliminates the backscatter from the medium and enhances the object signature. This yields a horizontal slice, but not a vertical slice or third dimension.

Despite the availability of such techniques, existing lidar systems are limited by the size of the receiver optics that can be used in a scanner. Generally, the light reflected from objects that are deep within a medium or are in a very turbid medium is weak. Although large aperture optics can aid in maximizing the amount of light collected from weak returns, the size of the optics that can be used in a scanner is restricted by the size of the moving prisms or mirrors.

Furthermore, those systems which utilize range gating, instead of volume scanning, suffer from poor range resolution and area coverage. When the object is at a different depth than expected, the object return will be subtracted as well as the background, and poor performance results. Additionally, very large pulse energies are required to obtain sufficient signal-to-noise ratios to detect objects at even moderate depths.

A need thus exists for a system which can provide an accurate and reliable image of an object embedded (particularly deeply embedded) in a very turbid medium.

The problems and deficiencies of the prior art are overcome or alleviated by the present invention. More specifically, the present invention provides for a system which can penetrate a light reflecting medium over a considerable slice (width) without requiring fast electronic devices.

SUMMARY OF THE INVENTION

The present invention provides a system for detecting a object in a light reflecting medium. The system includes a means for generating a series of discrete pulse beams in the shape of fan beams, each of which are substantially uniform in intensity, to illuminate sections of the medium.

In operation, a single pulse beam is emitted to illuminate a section of the medium. A large aperture optic collects the reflected portions of the pulse beam and focuses the reflected portions on the photocathode of a streak tube. Coupled to the streak tube is a detector which detects signals generated by the streak tube in response to the reflected portions of the pulse beam impinging on the photocathode. To obtain a volume display of the medium, the pulse beam and reflected beam are moved normal to the longitudinal axis of the pulse beam to illuminate adjacent sections of the turbid medium. A volume display of the medium is thus generated by combining the returns from adjacent sections of the medium.

The cathode on the streak tube is a thin strip behind a slit on which the illuminated strip of the scattering medium is imaged by the receiver optics. When the laser beam pulse, typically a few nanoseconds in duration, returns to the receiver from the surface of the medium the electronic sweep of the tube is initiated, so that the following time history of the returning signal spread across the lateral surface of the tube anode is then a record of the reflection from the medium itself and from any embedded bodies in the medium, including the reflection from the top surface of such objects and of the shadow below them. Because the slit cathode is long and covers the width of the medium illuminated by the fan shaped beam from the laser, the image on the anode phosphor is a wide vertical section of the medium. In addition to imaging objects entirely embedded in the medium, the invention also applies to imaging objects at a far interior surface and to obtaining a profile of interior-surface relief that may be the only way to silhouette and measure opaque irregularities or contours at that interior boundary.

The invention described herein can be useful in probing the contents of any turbid media through which light can pass, even if absorbed and scattered, as long as some return can be obtained. The items described in the following description are applicable to water probing, but there is no reason that the concept cannot be applied to the analysis of smaller volumes using very short laser pulses, picoseconds duration for example, since the streak tube can capture such time intervals.

The image on the anode can be photographed by means of a CCD camera or similar device, particularly by logarithmic area array CCD-like detectors, which is read out slowly compared to the fast duration of the returning signal. This enables one to view the phenomena on a cathode ray screen directly, or after encoding the signal, to enable one to process such images to obtain enhanced imagery through various means common to those versed in the art of enhancement, such as subtracting the mean return from the recorded section. The subsequent display of such sections can be manipulated by adding many sections together to provide a three-dimensional view of the medium and embedded objects. Such three-dimensional data sets, obtained by moving the sensor system normal to the fan beam between each exposure so that each section is from an adjacent section of the medium, provide the ability to enhance detection and reduce false alarms by rejecting images, such as relatively objects, that might not be apparent in any single section image.

DETAILED DESCRIPTION OF THE PREFERRED EMBODIMENT

Figure 1A:
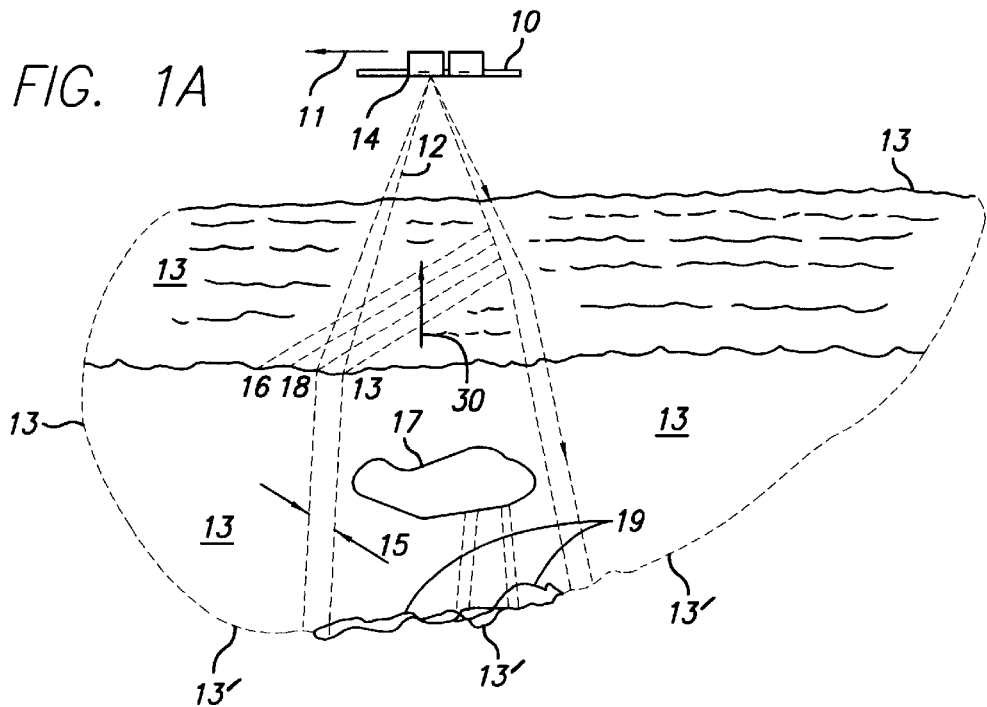
FIG. 1 shows a schematic showing of a moving platform employing the present invention to view objects in a turbid medium.

The present invention provides a system for detecting objects located in a light reflecting medium. The system can be utilized to observe the frontal interface of a medium, the structure of the medium including the distribution of particulate matter or suspended bodies, a far interior surface profile, and objects included in any of these. More particularly, the invention can be used to detect targets in any medium through which light can pass, even if absorbed and scattered, as long as some reflected light can be obtained. The system includes a light source for producing a series of discrete pulse beams which are substantially uniform in intensity. The reflected portions of the pulse beam are received by a detection system comprising receiving optics, a streak tube and a detector. In operation, the invention is mounted on a moving platform adapted for movement along the medium. A light source emits a narrow, fan-shaped pulse beam to illuminate a thin-slice of the turbid medium.

The detection system includes a light collecting optic, a streak tube and a detector. The light collecting optic collects reflected light and focuses it on the photocathode of the streak tube. To collect the maximum amount of light from weak returns, the aperture of the optic should be as large as possible. The photocathode on the streak tube, however, should be sufficiently large to encompass the image of the fan beam illuminated volume. Inside the streak tube, the photoelectrons emitted from the photocathode are accelerated and then electrostatically focused on the phosphor layer or anode of the streak tube. On passage from the cathode to the anode, the photoelectrons pass through a deflecting electric field which cause the photoelectrons to sweep across the anode. The field is created when a varying voltage is applied to the deflecting plates in the tube. The result is a two-dimensional signal, consisting of the temporal variation of the detected light reflected from the turbid medium in one dimension, and the lateral position of the reflected light over the narrow, fan-shaped pulse beam in the other direction. The light emitted from the phosphor layer on the anode is coupled to a detector array.

A volume display of the medium is generated by translating the transmitted and received beams normal to the longitudinal axis of the pulse beam to illuminate adjacent sections of the medium, and combining the sections to provide a volume display. The motion is used to provide the scan or motion of the fan-shaped pulse beam.

The present invention is not exclusively restricted to analyzing the contents of large volumes. By using very short pulses, picoseconds in duration for example, the present invention can be used to analyze smaller volumes, and this is the focus of the claims in the present document. The streak tube observes the rapid return of the backscattered light by distributing the return in space and then reading the return out slowly. The return is in nanoseconds and picoseconds and the system of this invention allows a readout in milliseconds, thus obviating the necessity for faster electronic readouts.

Using the known speed of light as $3 \cdot 10^8$ m/sec, these pulse and propagation-distance values provide very fine spatial resolutions on the order of 1 psec$\cdot 3 \cdot 10^8$ m/sec=$3 \cdot 10^{-4}$ m, or 0.3 mm; and volume dimensions (e. a., depth) on the order of 1 nsec$\cdot 3 \cdot 10^8$ m/sec=$3 \cdot 10^{-1}$ m or 30 cm. In practice the speed of light is slower by a factor of roughly 4/3 in water and some other turbid media, leading to different resolutions (about 0.2 mm) and volume dimensions (about 20 to 25 cm). By the phrase "on the order of" we mean to refer to ranges of variation that encompass roughly an order of magnitude, or a half-order in either direction.

Normally, laser beams are non-uniform in intensity, with a maximum intensity at the center of the beam and a minimum intensity at the outermost edges of the pulse beam. This can be changed by applying tapered coatings to the laser mirrors, or by the use of optical means external to the laser. An optical invertor, comprised of a series of lenses and a diamond-shaped mirror arrangement, enhances the intensity at the outer portions of the pulse beam by optically inverting the intensity pattern of the pulse beam. The result is a pulse beam which compensates for the effect caused by longer paths at the ends of the fan to produce a return that is substantially uniform in intensity.

Figure 1B:
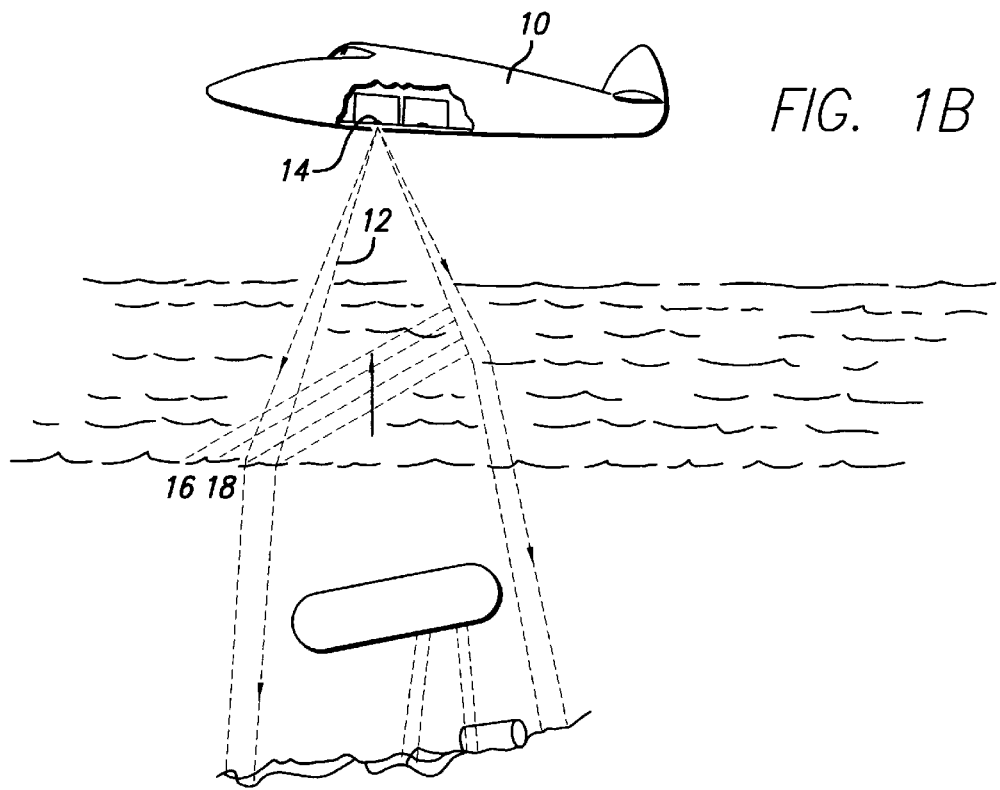

FIG. 1 shows a typical configuration of a moving platform 10 employing the present invention to detect embedded objects. A narrow, fan-shaped pulse beam 12 is projected from the transmitter to the medium 13, with the longitudinal axis of the pulse beam 12 normal to the direction of motion. The pulse beam 12 illuminates a thin section 15. Coverage of a volume is obtained by issuing a series of discrete pulse beams 16 18 to illuminate adjacent sections. After processing the successive slice images, the sections 15 can be displayed to show a scan through a volume of the medium. Thus, the motion 11 of the platform 10 carrying the system is used to provide the scan of the pulse beam. The pulse rate to generate the series of discrete pulse beams is set by the velocity.

Figure 2:
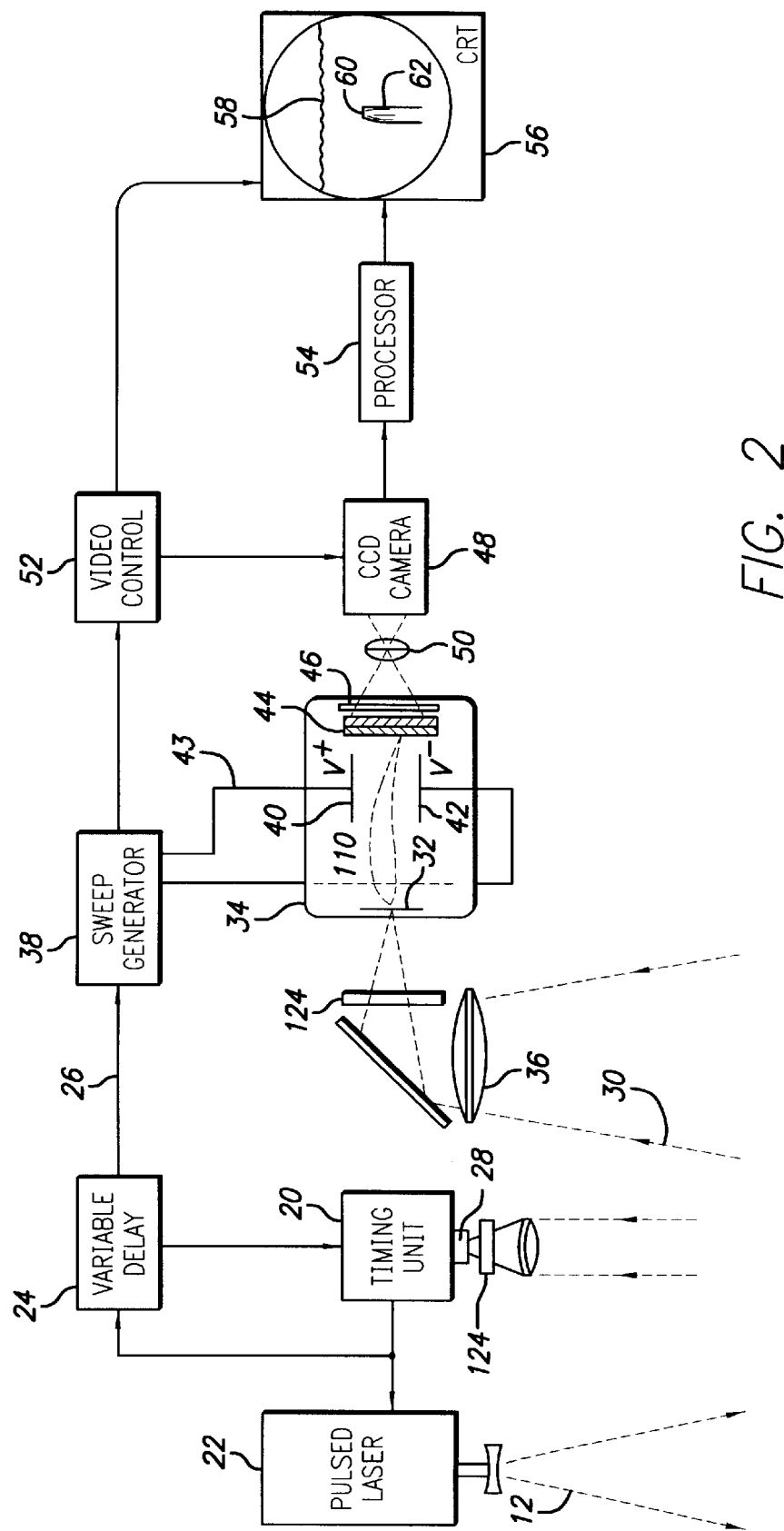
FIG. 2 is a block diagram of the preferred embodiment of the invention.

FIG. 2 shows a block diagram of the preferred embodiment of the invention. A timing unit 20 initiates the probing sequence by causing a laser 22 to emit a narrow, fan-shaped pulse beam 12 to illuminate a thin section. After the Q-switch 84 in the laser 22 has closed, causing the laser to fire, the timing unit 20 initiates the variable delay unit 24. The variable delay unit 24 issues a delay pulse 26 to initiate the receiving unit. In order to insure that the delay is correct, a detector 28, such as a photomultiplier, is used to sense the reflected portions 30 of the pulse beam. The timing unit 20 measures this time and resets the variable delay unit 24 to insure that the next delay pulse 26 is correct. Since the delay is variable, the invention can be operated at different distances from the medium.

The reflected portions 30 of the pulse beam are collected and focused on the photocathode 32 of a streak tube 34 by a large optical element, shown here as a lens 36. The photoelectrons 110 emitted from the photocathode 32 are accelerated by the streak tube anode voltage, and are focused into a line on the anode 44 by the electrostatic or magnetic field distribution in the streak tube 34, and are deflected by the electrostatic field set up between the deflection plates 42 in the streak tube 34. In other words, one field forms the image, and the other field set up between the deflection plates 42 moves the image. The delay pulse 26 initiates the action of a sweep generator 38, which causes a linearly increasing voltage 40 to be applied to the deflection plates 42 on the streak tube 34. The line electron image is deflected by the deflection plate voltage 40 so that the line sweeps across the streak tube anode 44, thus converting a temporal variation in the input signal into a spatial distribution on the anode 44. The anode 44 may be made of a phosphor, but since there are few photoelectrons 110 from the return when the beam has penetrated many diffusion lengths in the medium, additional photon gain is desired. Thus, the anode 44 is preferably made of a microchannel plate (MCP) intensifier, which provides the gain required to make photoelectrons 110 detectable. The electron output of the MCP is converted to photons again by means of a phosphor layer 46, so that the image of the temporal variation over the narrow fan-shaped pulse beam 12, now converted to a two-dimensional image, can be coupled to a detector array 48 by means of a fiber optic 120, or by a lens 50. The detector array 48 shown is a CCD, but it could easily be a diode array, and, in particular, a photodiode n-channel MOSFET array or diode limited CCD that provides a logarithmic response to high light levels.

If the accelerating voltage is high, gain can be obtained through the ionization created by the electrons directly in the detector. Thus, the anode 44 can be made of a backside thin CCD fabricated for this purpose, and a MCP and phosphor are not required.

The CCD detector array 48 is set to receive the image, before it arrives, by reading out the preceding frame. Once the sweep generator has completed the voltage rise and resets, a command is issued to the video control 52 to read the image on the CCD. The data is then passed to a processor S4, or directly to a cathode ray tube display 56, where a waterfall like display of the section of the medium probed by the pulse beam 12 can be seen. Typical images are that of the surface of the medium 58, a reflecting object 60, and a shadow from the reflecting object 62.

The subsequent display of such sections can be manipulated by adding many sections together to provide a volume display. Specifically, the sensor system is moved normal to the longitudinal axis of the pulse beam 12 between each exposure to illuminate adjacent sections. The adjacent sections are then combined to obtain a volume display.

As described, the present invention if used outdoors would only be able to probe deep depths at night because of solar illumination. For the system to operate in the day, narrow band interference filters 124 are required. The filters 124, placed in front of the photocathode 32 of the streak tube 34, are designed to pass the wavelength of the laser and block all other wavelengths. The combination of the filters 124, which can have a bandpass as small as or smaller than 1 nanometer, and the short time each element in the detector array 48 sees photoelectrons 110, typically 5 nanoseconds thereby resolving 0.56 meter in depth, would insure that few background photoelectron count in any pixel would be obtained.

Figure 3:
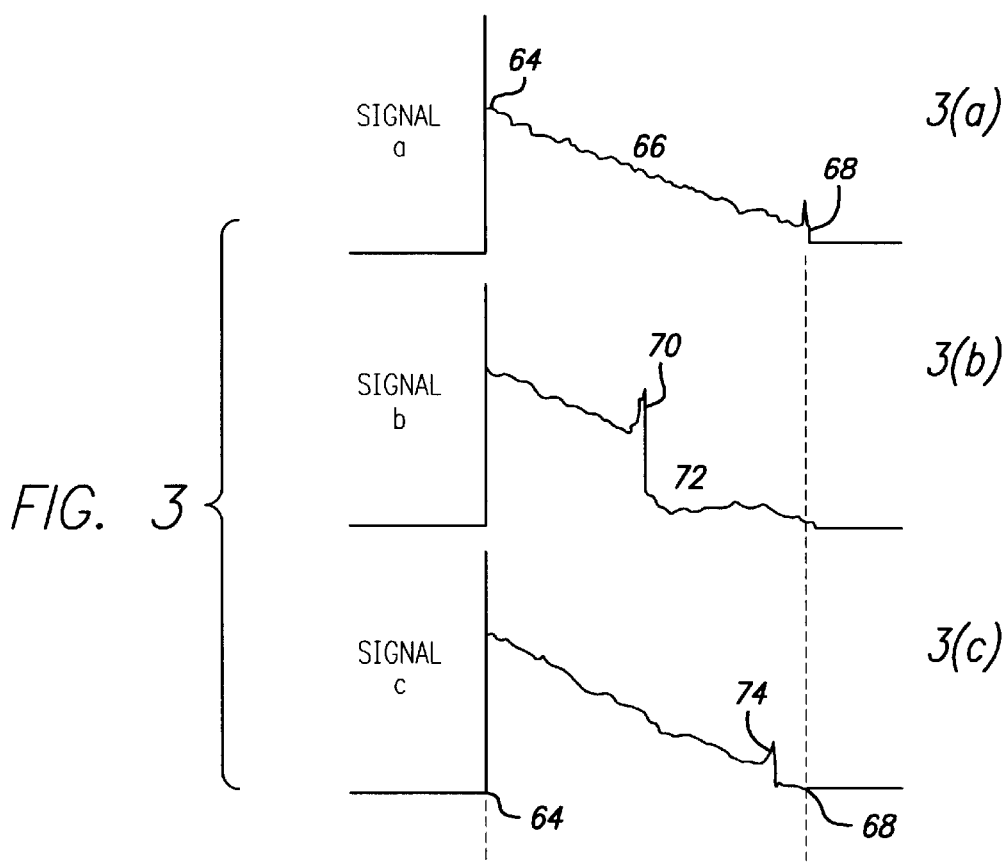
FIGS. 3(a)–3(c) is a timing diagram of signals obtained from use of the preferred embodiment in the system of FIG. 1.

FIG. 3 shows a timing diagram of signals obtained from the reflected portions 30 of the pulse beam. The time history of the reflected portions 30 of the pulse beam comprises a record of the reflection from the medium itself, and from any embedded bodies 17 in the medium, including the reflection from the top surface of such objects and of the shadow below them. Because the part of the medium illuminated by the pulse beam 12 is limited to a very thin section, the image on the phosphor layer 46 is a wide vertical section. The image can be photographed by means of a CCD camera or similar device, particularly by logarithmic area array CCD-like detectors, which read out slowly compared to the fast duration of the returning signal. Consequently, the phenomena on the cathode ray tube display 56 can be viewed directly, or the image can be processed to obtain enhanced imagery after the signal has been encoded. For the latter, various common enhancement means, such as subtracting the mean return from the recorded section of the medium, can be utilized.

In the regions of the pulse beam in which there are no objects, as shown in FIG. 3(a), there will be a sharp return from the air-medium interface 64 and then a smaller exponential return from the backscatter from the medium itself 66. The signal will end with a second sharp return 68 from the bottom or far interior surface of the medium, assuming the system can reach such a depth. The range capability of the system will depend on the attenuation length of light in the medium traversed. For example, the attenuation length of light in water varies from 40 meters, for Jerlov Type I clear ocean water, to a few meters, for Jerlov Type C turbid bay water.

When the pulse beam encounters an entirely embedded object 17 (FIG. 1), as shown in FIG. 3(b), the reflected portions of the pulse beam will be typified by a sharp leading edge 70 which will vary over the width of the pulse beam due to the roundness of the object. Following the return will be a shadow 72. Thus, the combination of the sharp leading edge 70 and the shadow 72 will comprise the signature of an entirely embedded body.

In addition to detecting targets which are immersed or wholly embedded in the medium, the present invention also detects object or irregularities 19 (FIG. 1) at the far interior surface 13' or the bottom of the medium. When the beam encounters an object on the bottom, as shown in FIG. 3(c), the system will detect a return from an object on the bottom 74 before it will detect a return from the bottom where no object is present 68. Thus, with a profile of the bottom topography, covered objects, can be distinguished from the bottom itself.

Figure 4:
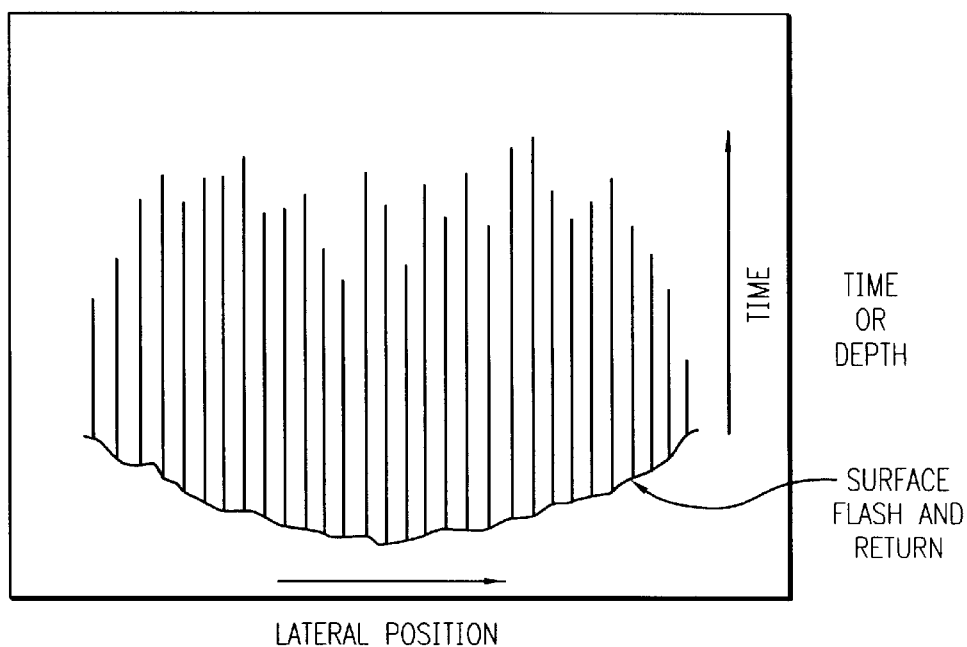
FIG. 4 is a diagram of the beam distribution on the MCP, phosphor and CCD.

A diagram of the beam distribution on the MCP, phosphor and CCD is shown in FIG. 4. The task of detecting the various components out of the return requires an analysis of the waveforms, such as those shown in FIG. 3(a)–3(c), over the width of the fan. This analysis is enabled by the principal embodiment of the invention that utilizes the streak tube to present a spatial display of all parts of the fan beam as a map of position versus time, or depth.

Figure 5:
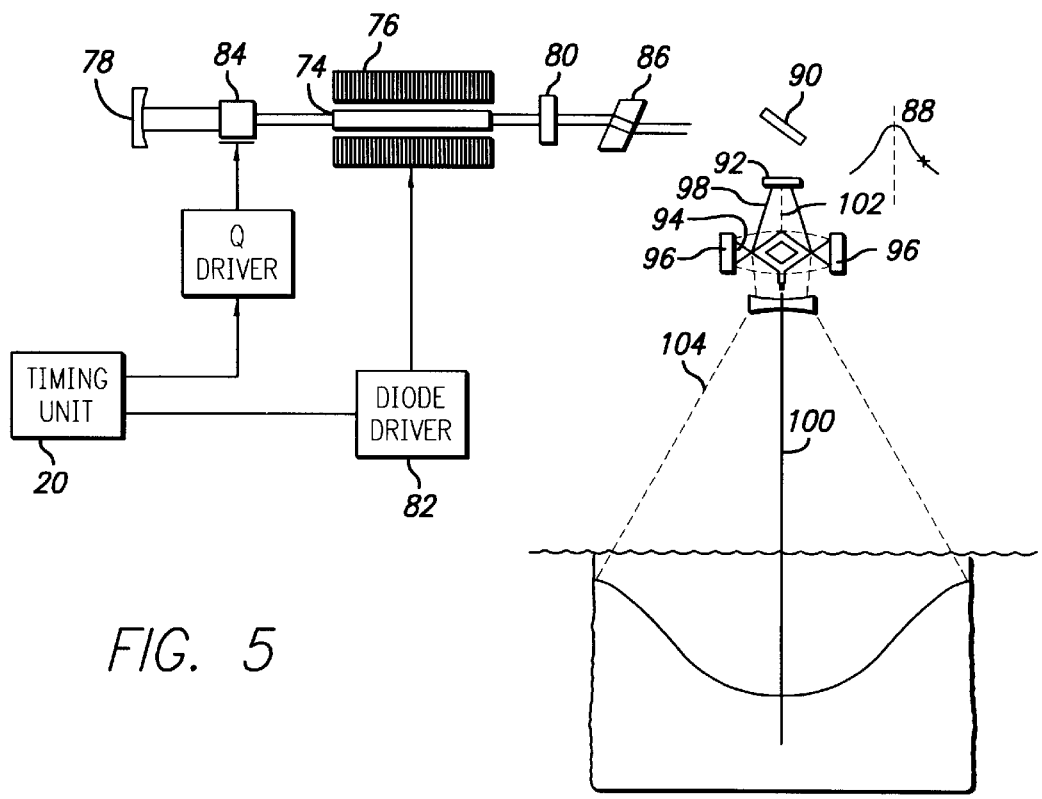
FIG. 5 is a schematic diagram of the laser and the projection optics of the preferred embodiment shown in FIG. 2.

The laser and the output projection optics are depicted in detail in FIG. 5. The laser required for the lidar of this invention is a typical Q-switched laser that can produce pulse widths of the order of 5 to 15 nanoseconds or a laser that can produce much shorter pulses on the order of picoseconds, as mentioned earlier.

Shown in FIG. 5 is a typical diode pumped YAG laser, consisting of the YAG rod 74, diode pumps 76 with a reflector 78, and an output coupling mirror 80 forming the resonant cavity of the laser. The diode pumps 76 are driven by a diode driver 82 triggered by the timing unit 20. When the rod 74 has been exposed to the pump energy and is maximally excited, the Q-switch 84 is opened and the lasing action sweeps through the excited states to produce an intense short pulse. These lasers commonly emit in the infrared, 1.06 micrometers. However, a nonlinear crystal in the path of the beam 86 can be arranged so that the frequency of the radiation is shifted.

The output of the laser, for the energy levels required, will be a beam with a half width of 4–6 mm. The beam will be expanded so that it can cover a very thin elongated section, as for example with an aspect ratio of 1:300, of the surface of the medium by means of an anamorphic optical element which has focal lengths in comparables proportion.

If the beam is gaussian 88, an optical invertor can be used to enhance the intensity of the outer portions of the pulse beam. After the beam is directed downward by a mirror 90 and slightly diverged by lens 92 it arrives at a diamond-shaped mirror arrangement 94 which cuts it into two parts as shown by the dashed lines, and reflects it outward to a set of mirrors 96, which return the beams to the central mirror arrangement 94. Because the beams reflect from three mirrors, the parts of the beam that were outside 98, and were the least intense, now fall at the inside of the beam 100. In the same respect, the parts of the beam that were in the inside 102, which were the most intense, now fall on the outside of the beam 104. This results in an inverted intensity pattern which then compensates for the increased path length to the ends of the pattern and for the cosine losses on illumination and on the return, to provide a more uniform signal over the illuminated region.

Figure 6:
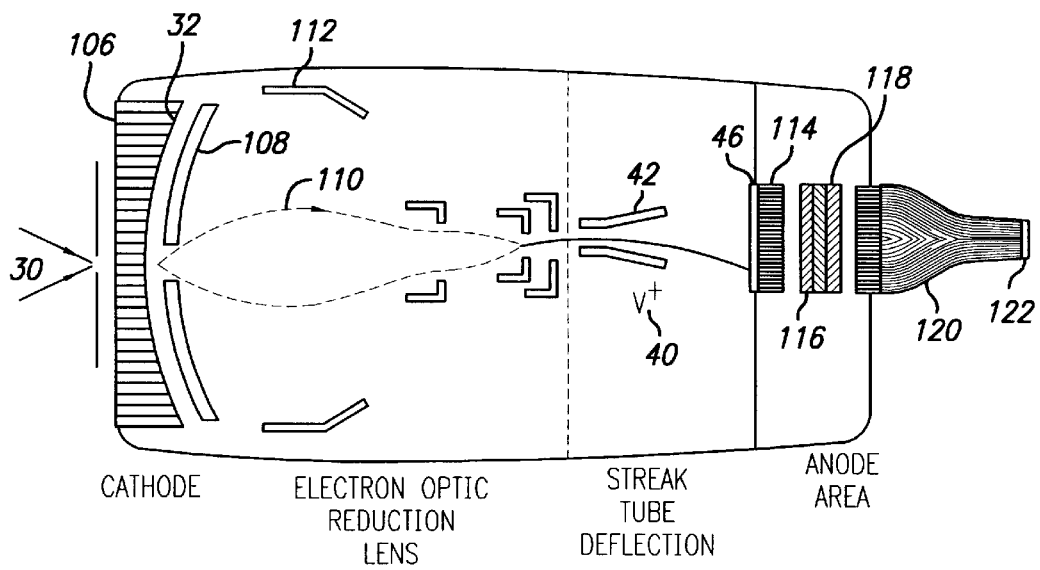
FIG. 6 is a schematic diagram of the detection system of the preferred embodiment shown in FIG. 2.

FIG. 6 is a schematic diagram of the detection system with the preferred embodiment. The most important part of the detection system is the streak tube. Any of the existing and commercially available designs are applicable to the invention, but there are characteristics which make some streak tubes better than others. The important specifications are cathode size, resolution and speed.

The photocathode 32 should be as large as possible to permit the use of a large light collecting optic. This is because the signal E that is collected by a detector element with an area A, in an optical system with a numerical aperture n.a. (n.a.=1/(2×f/#)) is given by the equation $E=\pi B (n.a.)^2 A$. The brightness of the lidar return is given by the laser energy, and the highly attenuated scattering from the object, or the medium. The numerical aperture of the light collecting optics is limited practically to 0.5, (f/1 optics), so that the only way to obtain an increased signal is to increase the detected sample area on the photocathode. Large photocathodes, however, are available in scintillation detectors, and electron optics are capable of imaging the photoelectrons. At present, there are intensifier tubes with S-20 300 mm photocathodes which would permit light collecting optics with aperture areas as great as 220 cm² to be used. These intensifier tubes have a signal strength 100 times greater than the signal strength of smaller, more readily available, tubes. Thus, the possibility of building or obtaining a large streak tube which would utilize the electron optics of larger intensifiers is well within the state of the art.

In order to produce usable detail in sectional images the resolution of the streak tube should be sufficient to permit observing 300 samples in width and time.

Even with a photocathode 32 as large as 300×1 mm, as shown in FIG. 6, the final image can be placed on a CCD as small as 7.5×7.5 mm. (Standard CCD size is 6.6×8.8 mm.) The light 30 from a fast large aperture light collecting optic 36 (f/1, 170 mm focal length) focuses on the fiber optic input window 106 and passes to the photocathode 32. The extraction electrode grid 108 accelerates the emitted photoelectrons 110 which are focused on the phosphor layer 46 by the focus electrodes 112. A varying voltage 40 on the deflection plates 42 causes the position of the photoelectron beam 110 to change rapidly, giving an output whose intensity versus distance is proportional to the input intensity versus time.

At the phosphor layer 46, the photoelectrons 110 are converted to photons, with some gain due to the accelerating voltage. The photons are then coupled to a second photocathode 114 at the input of an image intensifier consisting of microchannel plates (MCP's) 116. This permits the event to spread over the MCP structure to reduce the poor noise factor caused by wide pulse shapes and losses in pore structures that degrade typical MCP performance. At the output of the MCP's 116, a second phosphor layer 118 converts the photoelectrons to photons. The size of the second phosphor layer 118 and the MCP's 116 is about 40 mm, thus permitting a 30×30 mm image area. Typical dynamic electron optic resolutions and MCP resolutions are of the order of 10 lines/mm.

The last part of the detection system is the coupling of the second phosphor layer 118 to the detector array 122. Coupling to the CCD is often done by a lens 50, as shown in FIG. 3, or by a fiber optic coupler 120. The demagnification required is about the same in both cases, as is the loss in gain of 16 that is the result of a 4× reduction to typical 6.6×8.8-mm CCD's containing 25-micrometer photodetectors.

Commercially available streak tubes have photocathodes up to 30-mm in diameter, output phosphors up to 44 mm in diameter, and may have built-in MCP's. Speed and resolution are compatible with the specifications given above.

What is claimed is:

1. A system for imaging a small volume of a turbid medium, with objects therein; said system comprising:

a pulsed laser that emits a short laser pulse of duration in a picosecond range and having a first fan shape to selectively illuminate a thin slice of a turbid medium along an illumination-propagation path;

a streak tube having a photocathode behind a field-limiting slit so that a two-dimensional signal is obtained at an anode of the streak tube, the signal consisting of:

along one dimension, temporal variation of detected light reflected from the turbid medium through a second fan shape, along a reflection-reception path that is substantially aligned with the illumination-propagation path; said temporal variation corresponding to overall propagation time, in a picosecond or low-nanosecond range, within the turbid-medium thin slice so that depth within the turbid medium is mapped along said one dimension, and along the other dimension, lateral variation of the reflected light along the field-limiting slit;

a focal element that receives the reflected light along said reflection-reception path that is substantially aligned with the illumination-propagation path, and that images the illuminated slice of the medium on the slit at the input to the streak tube; and means for providing relative physical motion as between (1) the turbid medium and (2) at least portions of both the mutually aligned fan-shaped beam and light reflected from the turbid medium;

wherein the relative-physical-motion means enable successive imaging of adjacent sections of the medium.

2. The small-turbid-volume imaging system of claim 1, wherein:

the means for providing relative physical motion provide substantially continuous relative physical translation during operation to enable substantially continuing successive imaging of adjacent fan-beam-illuminated thin sections of the medium.

3. The small-turbid-volume imaging system of claim 1, wherein:

the streak-tube two-dimensional signal comprises an image of opaque irregularities and contours at a far interior surface of the medium.

4. The small-turbid-volume imaging system of claim 1, wherein:

the photocathode is substantially a thin strip disposed behind the field-limiting slit; and the focal element images the fan-beam-illuminated slice of the medium on the slit for illumination of the substantially thin-strip photocathode.

5. The small-turbid-volume imaging system of claim 4, wherein:

the means for providing relative physical motion provide substantially continuing relative physical translation during operation to enable substantially continuing successive imaging of adjacent fan-beam-illuminated thin sections of the medium.

6. The small-turbid-volume imaging system of claim 4, wherein:

resolution is on the order of a fraction of a millimeter.

7. The small-turbid-volume imaging system of claim 6, wherein:

the means for providing relative physical motion provide substantially continuing relative physical translation during operation to enable substantially continuing successive imaging of adjacent fan-beam-illuminated thin sections of the medium.

8. The small-turbid-volume imaging system of claim 6, wherein:

said depth is on the order of a fraction of a meter.

9. The small-turbid-volume imaging system of claim 8, wherein:

the means for providing relative physical motion provide substantially continuing relative physical translation during operation to enable substantially continuing successive imaging of adjacent fan-beam-illuminated thin sections of the medium.

10. A system for imaging a small volume of a turbid medium, with objects therein; said system comprising:

a pulsed laser that emits a short laser pulse of duration in a picosecond range and having a first thin fan-beam share to selectively illuminate a thin section of a turbid medium alone an illumination-propagation path, wherein: at least some point on or within the medium, the thin fan beam has two orthogonal cross-sectional dimensions, one of the two dimensions being at least five times the other of the two dimensions;

a focal element for receiving light reflected through a second fan shape, along a reflection-reception path substantially aligned with the illumination-propagation path, and for forming a generally slit-shaped image of the illuminated thin section of the medium;

a field-limiting slit disposed to receive the image;

a streak tube having a photocathode that is substantially a thin strip, and that is disposed behind the field-limiting slit so that a two-dimensional representation of the small-turbid-medium volume is obtained at an anode of the streak tube, distance from one edge of said anode representing substantially directly distance within the small-turbid-medium volume.

11. The small-turbid-volume imaging system of claim 10, wherein:

the streak-tube two-dimensional representation comprises a silhouette of opaque irregularities and contours at a remote interior surface of the medium.

12. The small-turbid-volume imaging system of claim 10, wherein:

one of the two dimensions is at least ten times the other of the two dimensions.

13. The small-turbid-volume imaging system of claim 10, wherein:

one of the two dimensions is at least thirty times the other of the two dimensions.

14. The small-turbid-volume imaging system of claim 10, wherein:

one of the two dimensions is at least one hundred times the other of the two dimensions.

15. The small-turbid-volume imaging system of claim 10, wherein:

one of the two dimensions is at least three hundred times the other of the two dimensions.

16. The small-turbid-volume imaging system of claim 2, wherein:

resolution is on the order of a fraction of a millimeter.

17. The small-turbid-volume imaging system of claim 16, wherein:

said distance is on the order of a fraction of a meter.

18. The small-turbid-volume imaging system of claim 17, further comprising:

means for providing relative physical motion as between (1) the turbid medium and (2) at least portions of both the mutually aligned thin-fan-shaped beam and light reflected from the turbid medium;

wherein the relative-physical-motion means enable successive imaging of adjacent sections of the medium.

19. The small-turbid-volume imaging system of claim 18, wherein:

the means for providing relative physical motion provide substantially continuing relative physical translation during operation to enable substantially continuing successive imaging of adjacent fan-beam-illuminated thin sections of the medium.

20. The small-turbid-volume imaging system of claim 16, further comprising:

means for providing substantially continuing relative physical motion, during operation, as between (1) the turbid medium and (2) at least portions of both the mutually aligned fan-shaped beam and light reflected from the turbid medium;

wherein the relative-physical-motion means enable substantially continuing successive imaging of adjacent thin-fan-beam-illuminated thin sections of the medium.

21. The small-turbid-volume imaging system of claim 20, wherein:

the means for providing relative physical motion provide substantially continuous relative physical translation.

22. A system for imaging a small volume of a turbid medium, with objects therein; said system comprising:

a pulsed laser that emits a short laser pulse of duration in a picosecond range and having a first thin fan-beam shape to selectively illuminate a thin section of a turbid medium along an illumination-propagation path;

a focal element for receiving light reflected through a second fan shape, along a reflection-reception path substantially aligned with the illumination-propagation path, and for forming a generally slit-shaped image of the illuminated thin section of the medium;

a field-limiting slit disposed to receive the image;

a streak tube having a photocathode that is substantially a thin strip, and that is disposed behind the field-limiting slit so that a two-dimensional representation of the small-turbid-medium volume is obtained at an anode of the streak tube, distance from one edge of said anode representing substantially directly distance within the small-turbid-medium volume; and means for providing substantially continuous relative physical motion, during operation, as between (1) the turbid medium and (2) at least portions of both the mutually aligned fan-shaped beam and light reflected from the turbid medium;

wherein the relative-physical-motion means enable substantially continuing successive imaging of adjacent thin-fan-beam-illuminated sections of the medium.

23. The small-turbid-volume imaging system of claim 22, wherein:

the means for providing relative physical motion provide substantially continuous relative physical translation.

24. A system for imaging a small volume of a turbid medium, with objects therein; said system comprising:

a pulsed laser that emits a short laser pulse of duration in a picosecond range and having a first thin fan-beam shape to selectively illuminate a thin section of a turbid medium along an illumination-propagation path;

the first thin fan-beam shape having, at least some point on or within the medium, a cross-section that is at least three times greater in one direction than in another;

a focal element for receiving light reflected through a second fan shape, along a reflection-reception path substantially aligned with the illumination-propagation path, and for forming a generally slit-shaped image of the illuminated thin section of the medium;

a field-limiting slit disposed to receive the image;

a streak tube having a photocathode that is substantially a thin strip, and that is disposed behind the field-limiting slit so that a two-dimensional representation of the small-turbid-medium volume is obtained at an anode of the streak tube, distance from one edge of said anode representing substantially directly distance within the small-turbid-medium volume.

\* \* \* \* \*